US012272342B2

(12) United States Patent
Yokota

(10) Patent No.: US 12,272,342 B2
(45) Date of Patent: Apr. 8, 2025

(54) FILTER EFFECT IMPARTING DEVICE, ELECTRONIC MUSICAL INSTRUMENT, AND CONTROL METHOD FOR ELECTRONIC MUSICAL INSTRUMENT

(71) Applicant: CASIO COMPUTER CO., LTD., Tokyo (JP)

(72) Inventor: Masuo Yokota, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 833 days.

(21) Appl. No.: 17/441,269

(22) PCT Filed: Jan. 17, 2020

(86) PCT No.: PCT/JP2020/001509

§ 371 (c)(1),
(2) Date: Sep. 20, 2021

(87) PCT Pub. No.: WO2020/195041

PCT Pub. Date: Oct. 1, 2020

(65) Prior Publication Data

US 2022/0157284 A1 May 19, 2022

(30) Foreign Application Priority Data

Mar. 25, 2019 (JP) ................................ 2019-055829

(51) Int. Cl.
*G10H 1/12* (2006.01)

(52) U.S. Cl.
CPC .................................... *G10H 1/12* (2013.01)

(58) Field of Classification Search
CPC ....................................................... G10H 1/12
See application file for complete search history.

(56) References Cited

U.S. PATENT DOCUMENTS 11,393,479 B2 * 7/2022 Schnabel .............. G10L 19/028
2019/0266986 A1 * 8/2019 Krumins .................. G10H 1/02
2019/0379977 A1 * 12/2019 Büttner .................. G06N 3/088

FOREIGN PATENT DOCUMENTS

EP 2226794 B1 * 11/2017 ......... G10L 21/0208
JP 3217739 B2 10/2001

OTHER PUBLICATIONS

International Preliminary Report on Patentability (IPRP) (and English language translation thereof) dated Sep. 28, 2021 issued in International Application No. PCT/JP2020/001509.
International Search Report (ISR) (and English translation thereof) dated Mar. 31, 2020 issued in International Application No. PCT/JP2020/001509.
Written Opinion dated Mar. 31, 2020 issued in International Application No. PCT/JP2020/001509.

* cited by examiner

*Primary Examiner* — Jianchun Qin
(74) *Attorney, Agent, or Firm* — Holtz, Holtz & Volek PC

(57) ABSTRACT

A filter effect imparting device includes a characteristic-variable filter that has a variable filter characteristic corresponding to a coefficient group composed of a plurality of filter coefficients, and a control circuit that changes the coefficient group from a first coefficient group that is set as a start point to a second coefficient group that is set as an end point. The control circuit retains the coefficient group during the change and, in newly setting a third coefficient group as the end point, the control circuit sets the retained coefficient group as the start point.

13 Claims, 6 Drawing Sheets

FILTER EFFECT IMPARTING DEVICE, ELECTRONIC MUSICAL INSTRUMENT, AND CONTROL METHOD FOR ELECTRONIC MUSICAL INSTRUMENT

TECHNICAL FIELD

The present invention relates to a filter effect imparting device, an electronic musical instrument, and a control method for the electronic musical instrument.

BACKGROUND ART

There is known an electronic musical instrument that is capable of generating musical sound signals for various sounds by successively applying time-variant filter coefficients to a digital filter device (for example, see Patent Document 1). The electronic musical instrument of this type changes multiple filter coefficients by using time-variant envelope signals as a parameter.

CITATION LIST

Patent Literature

Patent Literature 1: JP3217739B2

SUMMARY

Technical Problem

According to the above technique, the envelope signals are changed in a predetermined range. The electronic musical instrument therefore can be changed only between two filter characteristics, and may not switch filter characteristics more effectively.

The present invention has been conceived in view of the above issue. An advantage of the present invention is that a filter effect imparting device, an electronic musical instrument, and a control method for the electronic musical instrument that can effectively switch filter characteristics are provided.

Solution to Problem

To solve the above issue, according to the present invention, there is provided a filter effect imparting device including: a characteristic-variable filter that has a variable filter characteristic corresponding to a coefficient group composed of a plurality of filter coefficients; and a control circuit that changes the coefficient group from a first coefficient group that is set as a start point to a second coefficient group that is set as an end point, wherein the control circuit retains the filter coefficient group during the change and, in newly setting a third coefficient group as the end point, the control circuit sets the retained coefficient group as the start point.

According to the present invention, there is provided an electronic musical instrument including: a performance operation receiver with which a user performs a performance operation; a musical sound generator that generates a musical sound corresponding to the performance operation on the performance operation receiver; a characteristic-variable filter that has a variable filter characteristic corresponding to a coefficient group composed of a plurality of filter coefficients; a control circuit that changes the coefficient group from a first coefficient group that is set as a start point to a second coefficient group that is set as an end point;

and an effect imparter that performs, using the characteristic-variable filter, filtering on the musical sound generated by the musical sound generator, wherein the control circuit retains the coefficient group during the change and, in newly setting a third coefficient group as the end point, the control circuit sets the retained coefficient group as the start point.

Further, according to the present invention, there is provided a control method for an electric musical instrument that includes: a performance operation receiver with which a user performs a performance operation; a musical sound generator that generates a musical sound corresponding to the performance operation on the performance operation receiver; and a characteristic-variable filter that has a variable filter characteristic corresponding to a coefficient group composed of a plurality of filter coefficients, the method including causing the electronic musical instrument to perform: controlling that is changing the coefficient group from a first coefficient group that is set as a start point to a second coefficient group that is set as an end point; and effect imparting that is performing, using the characteristic-variable filter, filtering on the musical sound generated by the musical sound generator, wherein the controlling retains the coefficient group during the change and, in newly setting a third coefficient group as the end point, sets the retained coefficient group as the start point.

Advantageous Effects of Invention

According to the present invention, filter characteristics can be effectively switched.

DESCRIPTION OF EMBODIMENT

Hereinafter, an embodiment of a filter effect imparting device and an electronic musical instrument that includes the filter effect imparting device is described with reference to FIG. 1 to FIG. 8.

The embodiment shows a sound effect imparting device that imparts sound effects as filter effects as an example. The present invention, however, is also applicable to general filter effect imparting devices including a device that imparts filter effects other than sound effects.

The embodiment described below is also provided with various limitations technically preferable for carrying out the present invention. However, the scope of the present invention is not limited to the embodiment below or illustrated examples.

Figure 1:
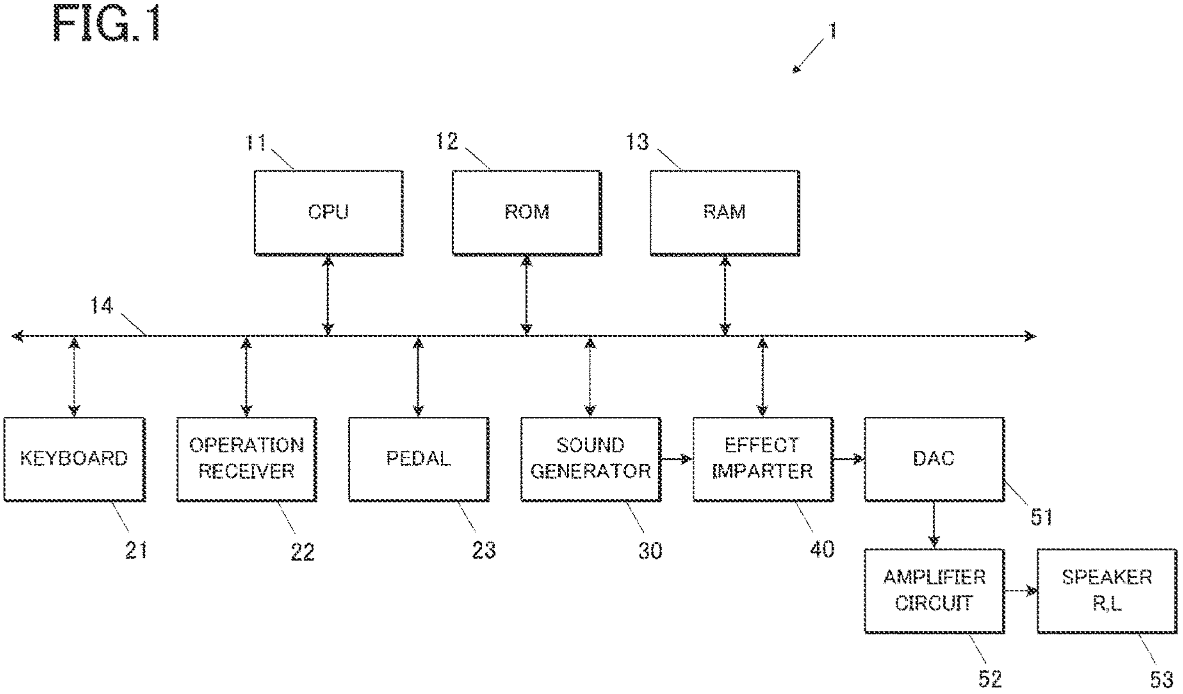
FIG. 1 is a block diagram showing a schematic configuration of an electronic musical instrument according to an embodiment.

FIG. 1 is a block diagram showing a schematic configuration of an electronic musical instrument 1 according to this embodiment.

As shown in FIG. 1, the electronic musical instrument 1 includes: a central processing unit (CPU) 11; a read only memory (ROM) 12; a random access memory (RAM) 13; a keyboard 21; an operation receiver 22; a pedal 23; a sound generator 30; an effect imparter 40; a D/A converter (DAC) 51; an amplifier circuit 52; and a speaker 53. The components except for the DAC 51, the amplifier circuit 52, and the speaker 53 are connected to each other through a data bus 14.

The CPU 11 controls the entire electronic musical instrument. The CPU 11 reads programs and data from the ROM 12 that stores various programs and data to execute the programs. The data generated in execution of the programs is stored in the RAM 13 as a work area.

Various functions (control processes) that are carried out by the programs and the CPU 11, which is a universal control circuit and a universal processor, may be carried out by specific circuits for the respective functions.

The keyboard 21, the operation receiver 22, and the pedal 23 receive operations of a user (player). The operation receiver 22 and the pedal 23 instruct contents of changes in musical sounds that are generated by the user operation of pressing the keyboard 21. The keyboard 21, the operation receiver 22, and the pedal 23 output signals (performance operation information) corresponding to the contents of the operations to the CPU 11. On the basis of the performance operation information from the keyboard 21, the operation receiver 22, and the pedal 23, the CPU 11 outputs sound generation commands to the sound generator 30.

On the basis of the sound generation commands from the CPU 11, the sound generator 30 obtains waveform data from the ROM 12 or the RAM 13, generates musical sound data, and outputs the musical sound data to the effect imparter 40.

The effect imparter 40 is constituted of a digital signal processor (DSP). The effect imparter 40 imparts predetermined sound effects to the musical sound data generated by the sound generator 30 on the basis of the user operation, and outputs the musical sound data to the DAC 51.

The DAC 51 converts the musical sound data that is digital signals output by the effect imparter 40 into analog signals. The musical sound data converted into analog signals passes through the amplifier circuit 52 and is output from the speaker 53 that is a pair of right and left speakers.

Figure 2:
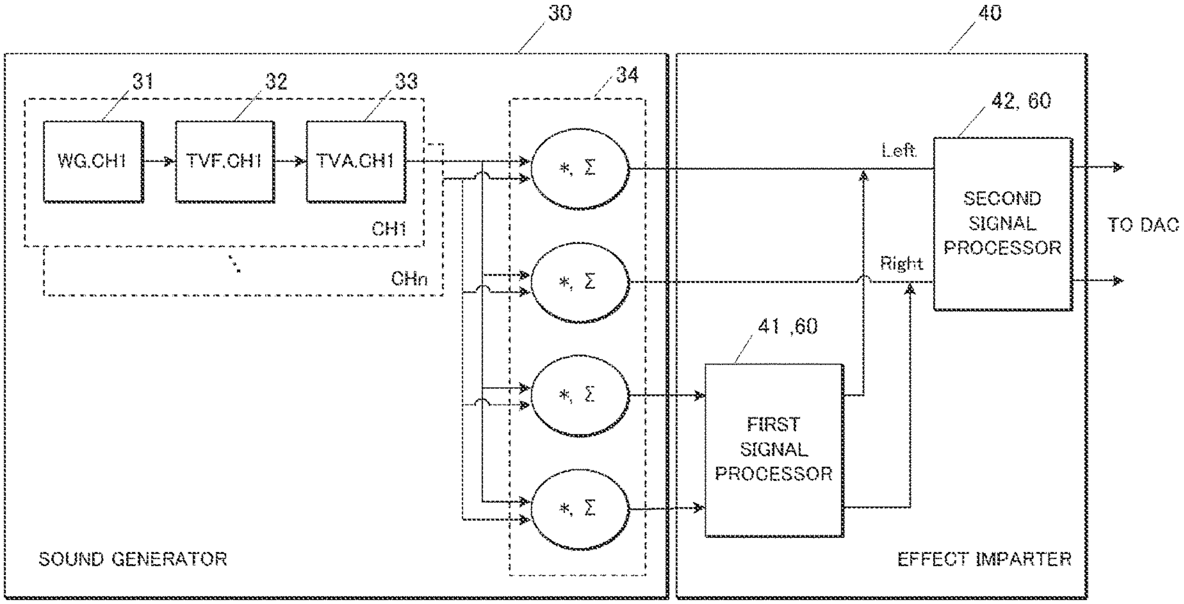
FIG. 2 is a block diagram showing a specific configuration of a sound generator and an effect imparter according to the embodiment.

FIG. 2 is a block diagram showing a specific configuration of the sound generator 30 and the effect imparter 40.

As shown in FIG. 2, in the sound generator 30, for the respective n channels (n corresponds to the number of generated sounds), a waveform generator (WG) 31 generates musical-sound waveform data corresponding to the performance operation information; a time-variant filter (TVF) 32 performs filtering on the musical-sound waveform data; and a time-variant amplifier (TVA) 33 performs amplifier envelope processing on the musical-sound waveform data. The musical sound data generated for the respective n channels is subjected to prescribed weighting and then added up for each of four lines (two channels (right and left channels)×2) by a mixer 34. The musical sound data is then output to the effect imparter 40.

The effect imparter 40 includes two signal processors 60 that are a first signal processor 41 and a second signal processor 42. The two signal processors 60 perform processing of imparting predetermined sound effects to the musical sound data that is individually output by the sound generator 30. In this embodiment, the first signal processor 41 performs insertions and system effects, and the second signal processor 42 performs master effects in the last stage. The musical sound data processed by the two signal processors 60 is eventually output as the musical sound data for two channels (right and left) to the DAC 51.

The signal processors 60 perform predetermined filtering on the musical sound data. The sound effect imparting device according to the present invention at least includes the signal processor 60 and the CPU 11.

The sound effect imparting device according to the present invention is applicable not only to the signal processors 60 of the effect imparter 40 but also to the time-variant filter 32 of the sound generator 30. The time-variant filter 32 is typically implemented as hardware logic for time-sharing processing, and the signal processors 60 of the effect imparter 40 are typically implemented as a DSP, a high-speed CPU, or the like. The way of implementing the time-variant filter 32 and the signal processors 60 is not limited to the above. The time-variant filter 32 and the signal processors 60 may be configured appropriately.

Figure 3:
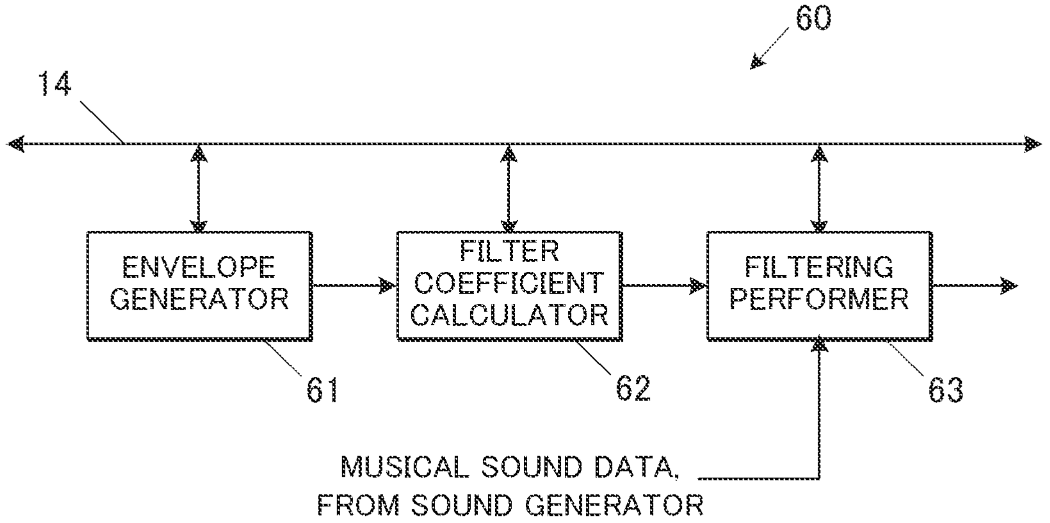
FIG. 3 is a block diagram showing a configuration of a signal processor according to the embodiment.

FIG. 3 is a block diagram showing a configuration of the signal processor 60.

As shown in FIG. 3, the signal processor 60 includes an envelope generator 61, a filter coefficient calculator 62, and a filtering performer 63 that are connected to the data bus 14.

Figure 5:
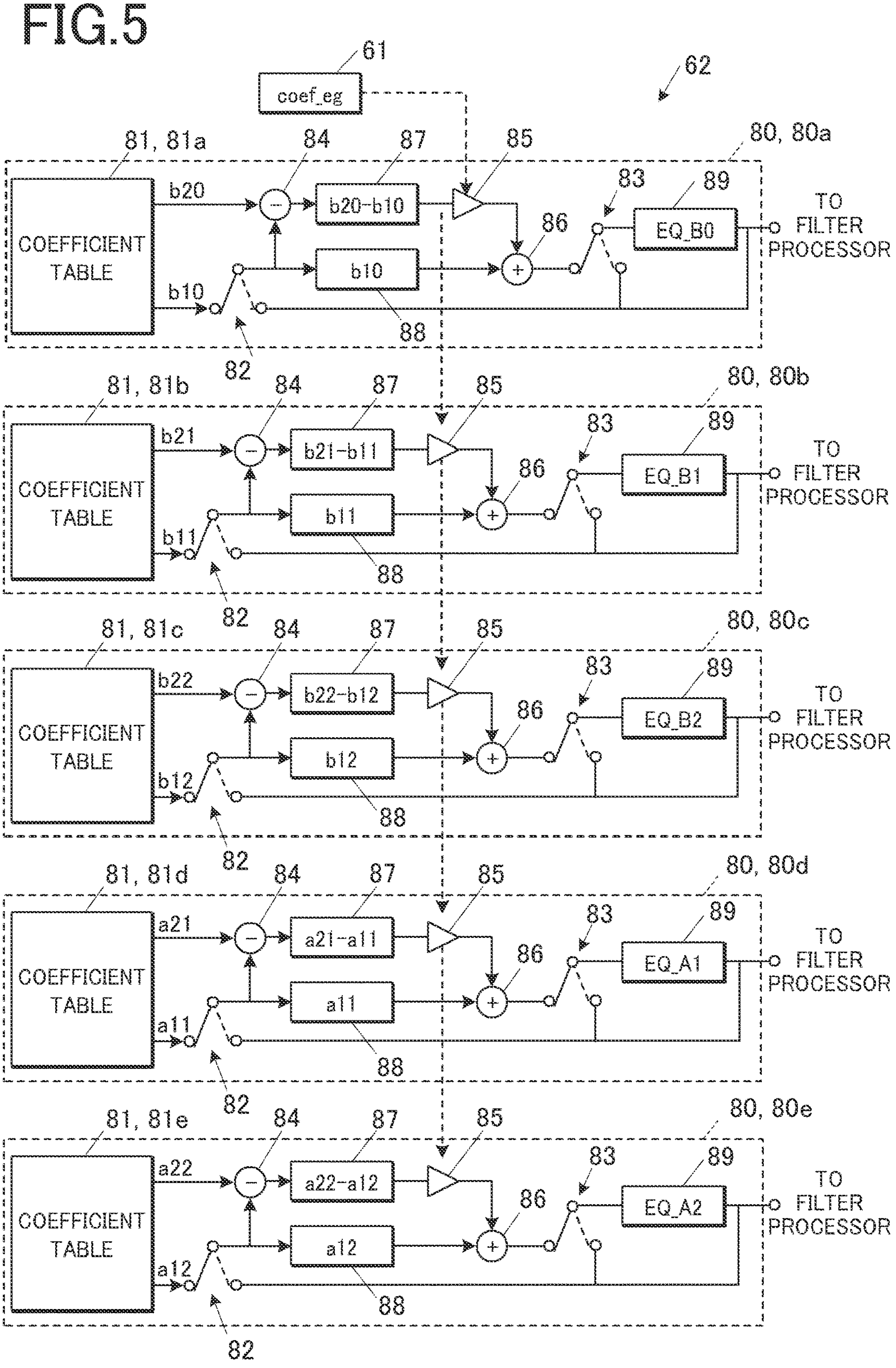
FIG. 5 is a block diagram showing a circuit configuration of a filter coefficient calculator according to the embodiment.

The envelope generator 61 generates a time-variant envelope signal (coef_eg, see FIG. 5). The envelope signal in this embodiment changes between 0 and 1. The envelope signal is updated and generated by successively adding a rate value at each sampling cycle. Generation of the envelope signal may be performed by a hardware or by a control device (e.g., CPU 11) successively. Generation of the envelope signal may be at a cycle slower than the sampling cycle.

The filter coefficient calculator 62 calculates a group of multiple filter coefficients (b0, b1, b2, a1, a2 to be described later) on the basis of parameters based on the performance operation information input by the CPU 11 and the envelope signal generated by the envelope generator 61. The filter coefficients change with passage of time according to the time-variant envelope signal.

Calculation of the filter coefficients is described in detail later.

The filtering performer 63 performs filtering on the musical sound data on the basis of the filter characteristic corresponding to the multiple filter coefficients.

Figure 4:
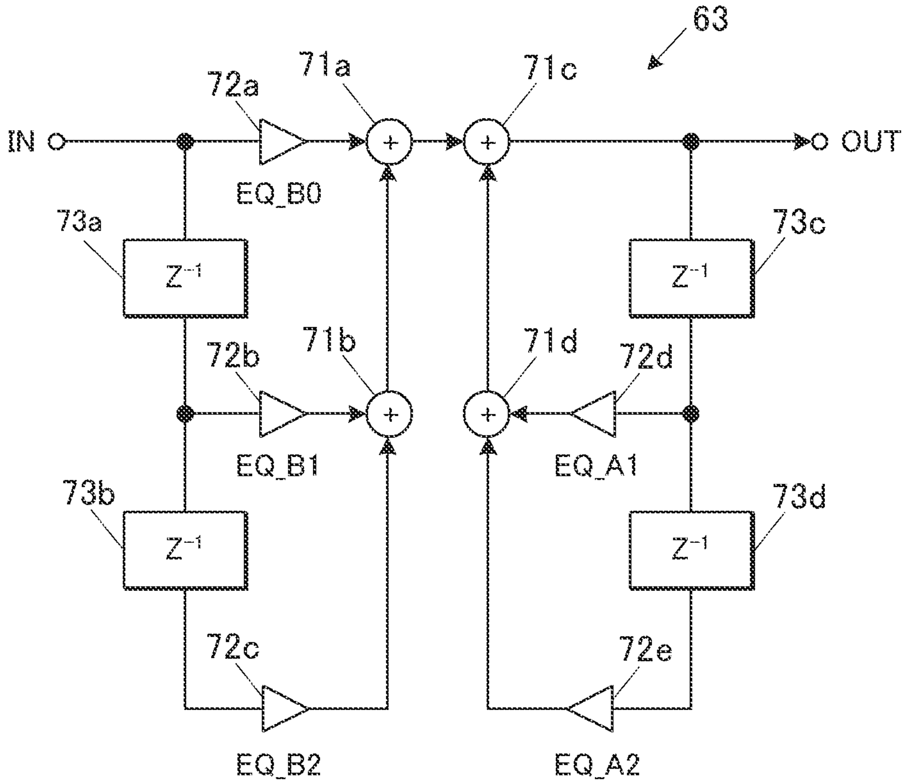
FIG. 4 is a block diagram showing a circuit configuration of a filtering performer according to the embodiment.

FIG. 4 is a block diagram showing a circuit configuration example of the filtering performer 63.

As shown in FIG. 4, the filtering performer 63 in this embodiment is a typical biquad filter. FIG. 4 shows a normal biquad filter. When a multidimensional filter is used, the biquad filter can be combined appropriately.

Specifically, the filtering performer 63 includes adders 71*a* to 71*d*, multipliers 72*a* to 72*e*, and delayers 73*a* to 73*d*. In the filtering performer 63, each of the multipliers 72*a* to 72*e* is given a filter coefficient calculated by the filter coefficient calculator 62, and each of the multipliers 72*a* to 72*e* multiplies an input signal by the filter coefficient.

Hereinafter, filter coefficients are denoted as b0 (EQ_B0), b1 (EQ_B1), b2 (EQ_B2), a1 (EQ_A1), and a2 (EQ_A2). These filter coefficients form one coefficient group.

FIG. 5 is a block diagram showing a circuit configuration example of the filter coefficient calculator 62.

As shown in FIG. 5, the filter coefficient calculator 62 operates at the same cycle as the sampling cycle of the filtering performer 63, calculates multiple filter coefficients, and outputs the filter coefficients to the filtering performer 63. More specifically, the filter coefficient calculator 62 includes five arithmetic blocks 80 (80*a* to 80*e*) that individually calculate the five filter coefficients (b0, b1, b2, a1, a2).

Each of the arithmetic blocks 80 includes a coefficient table 81, switches 82, 83, a subtractor 84, a multiplier 85, an adder 86, and registers 87 to 89.

The coefficient table 81 stores beforehand multiple sets of a start point and an end point for the respective filter coefficients corresponding to the filter characteristic of the filtering performer. The coefficient table 81 may temporarily store the start point and the end point retrieved from the ROM 12 or the RAM 13 at each operation. The coefficient table 81 itself may be stored in the ROM 12 or the RAM 13.

From the five coefficient tables 81 (81*a* to 81*e*) in the five arithmetic blocks 80, a coefficient group for start point and a coefficient group for end point are retrieved. In this embodiment, the coefficient group 1 for the start point is {b10, b11, b12, a11, a12}, and the coefficient group 2 for the end point is {b20, b21, b22, a21, a22}. Herein, the first number after the alphabet in each coefficient indicates the start point or the end point (1: start point, 2: end point), and the second number indicates the order of the coefficient.

The switches 82, 83 switch processing operations of the arithmetic block 80 (filter coefficient calculator 62) between two modes: a coefficient updating mode where the filter coefficient is updated according to the changes of the envelope signal (switches 82, 83 are in the state of solid lines in FIG. 5); and a coefficient retaining mode where the filter coefficient is retained (switches 82, 83 are in the state of dashed lines in FIG. 5).

The switches 82, 83 switch the modes when the envelope signal reaches the end point or when the user performs a specific operation on the operation receiver 22 or the pedal 23, as described below. The end point of the envelope signal is 1 when the envelope signal changes from 0 to 1. The end point of the envelope signal is 0 when the envelope signal changes from 1 to 0.

When the filter coefficient calculator 62 is in the coefficient updating mode where the switches 82, 83 are in the state of solid lines in FIG. 5, the register 87 retains the difference between the start point and the end point, and the register 88 retains the start point. The difference at the register 87 is multiplied with the envelope signal coef_eg at the multiplier 85, added to the start point of the register 88, and then retained by the register 89.

The five filter coefficients output from the filter coefficient calculator 62 to the filtering performer 63 are formularized as the following equations (1) to (5).

$$EQ\_B0=b10+coef\_eg\times(b20-b10) \quad (1)$$

$$EQ\_B1=b11+coef\_eg\times(b21-b11) \quad (2)$$

$$EQ\_B2=b12+coef\_eg\times(b22-b12) \quad (3)$$

$$EQ\_A1=a11+coef\_eg\times(a21-a11) \quad (4)$$

$$EQ\_A2=a12+coef\_eg\times(a22-a12) \quad (5)$$

Thus, the envelope signal is a parameter that specifies a ratio indicating a closeness of the five filter coefficients to the coefficient group 1 as the start point and to the coefficient group 2 as the end point. In the coefficient updating mode, interpolation processing is performed for the five filter coefficients between the coefficient group 1 as the start point and the coefficient group 2 as the end point so that the ratio specified by the envelope signal is satisfied. Thus, interpolation of the filter coefficients is performed between the start point and the end point using the envelope signal, so that the filter coefficients are successively updated while gradually changing from the start point to the end point. That is, the filter coefficients are dynamically updated between the start point and the end point.

In this embodiment, linear interpolation is performed between the start point and the end point. Interpolation is, however, not limited to the linear interpolation. For example, coefficients may be allocated to the start point and the end point individually for separate calculation.

On the other hand, when the filter coefficient calculator 62 is in the coefficient retaining mode where the switches 82, 83 are in the state of dash lines in FIG. 5, the register 89 retains the filter coefficient at the point of time, and the register 88 retains the filter coefficient at the point of time as the start point. The coefficient is also reflected on the difference at the register 87.

Next, the filter coefficient calculation process that is performed by the filter coefficient calculator 62 is described.

Figure 6:
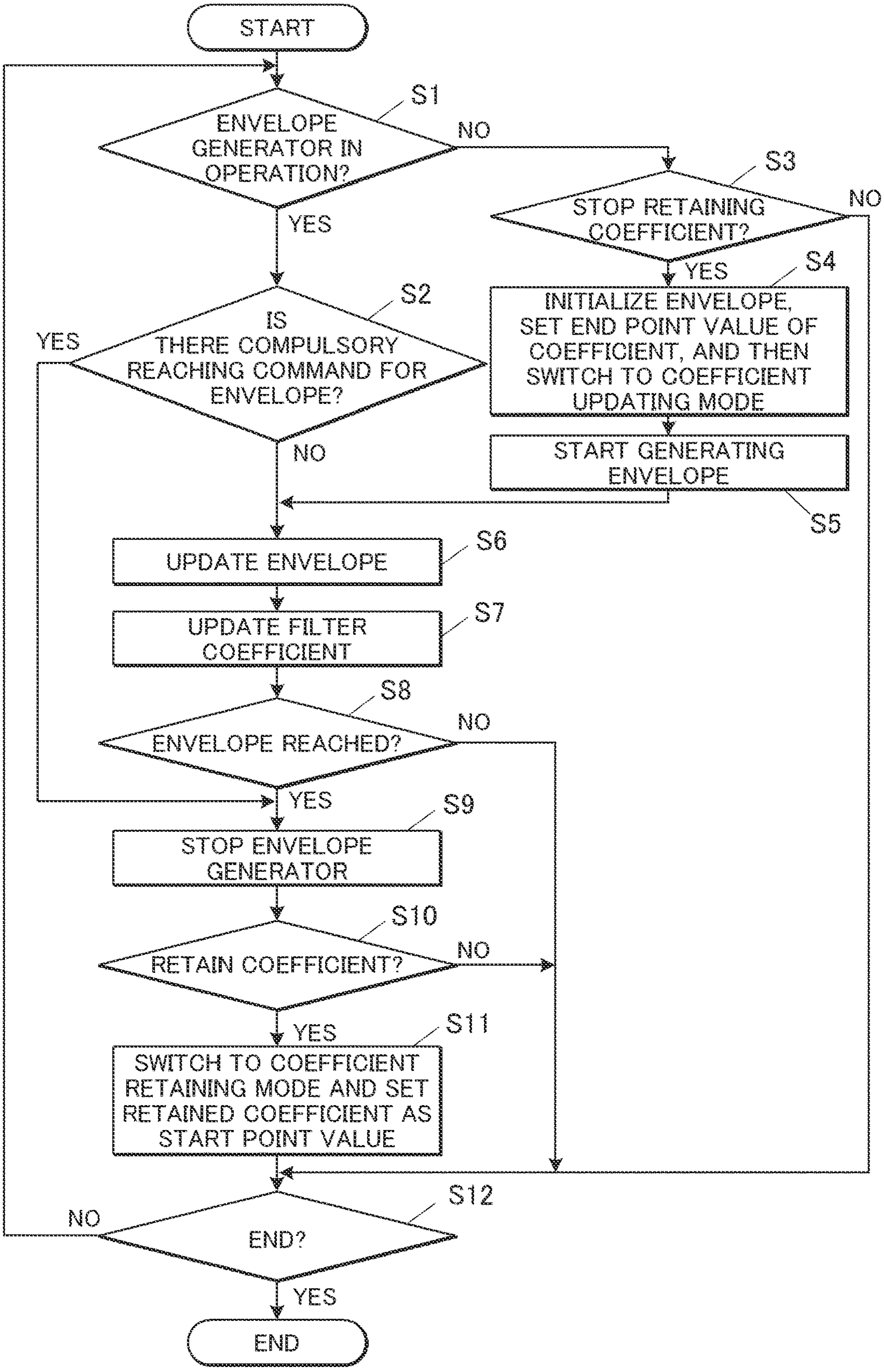
FIG. 6 is a flowchart showing a filter coefficient calculation process according to the embodiment.

FIG. 6 is a flowchart showing the filter coefficient calculation process.

The filter coefficient calculation process is performed as part of filtering performed by the CPU 11 that retrieves and executes a predetermined program.

In the description below, filtering is performed at a predetermined cycle using the filter coefficients at each point of time. In the initial state of filtering, the filter coefficient calculator 62 is in the coefficient updating mode; generation of the envelope signal is off (signal is zero); and filtering is performed using the coefficient group for the start point.

As shown in FIG. 6, when filtering is performed, the CPU 11 firstly determines whether the envelope generator 61 is performing operation of generating the envelope signal (Step S1).

In Step S1, when determining that the operation of generating the envelope signal is performed (Step S1: Yes), the CPU 11 determines whether a compulsory reach command for the envelope signal is input (Step S2).

The compulsory reach command is a command to switch the filter characteristic to a filter characteristic different from the filter characteristics corresponding to the start point and the end point at the point of time when the user performs a specific operation on the operation receiver 22 or the pedal 23, for example. The command stops generation of the envelope signal and retains each filter coefficient at the point of time. When detecting the user operation, the CPU 11 determines that the compulsory reach command for the envelope signal is input.

When determining that the compulsory reach command for the envelope signal is input (Step S2: Yes), the CPU 11 moves to Step S9 to be described later. When determining that the compulsory reach command for the envelope signal is not input (Step S2: No), the CPU 11 moves to Step S6 to be described later.

In Step S1, when determining that the operation for generating the envelope signal is not performed (Step S1: No), the CPU 11 determines whether to release the coefficient retaining mode in the filter coefficient calculator 62 (Step S3).

When determining that the coefficient retaining mode is not released (Step S3: No), the CPU 11 moves to Step S12 to be described later. If the filter coefficient calculator 62 is in the coefficient updating mode at the time, the CPU 11 operates the switches 82, 83 to switch to the coefficient retaining mode.

In Step S3, when determining that the coefficient retaining mode in the filter coefficient calculator 62 is released (Step S3: Yes), the CPU 11 clears the values of the envelope signal and resets the values of the envelope signal to initial values. The CPU 11 also retrieves, from the coefficient table 81, the end point for the respective filter coefficients in the filter coefficient calculator 62 and sets the end point to specific values, and then switches the switches 82, 83 to the coefficient updating mode (Step S4). If the filter coefficient calculator 62 has already been in the coefficient retaining mode, the CPU 11 keeps the coefficient retaining mode. When, for example, the start point for the respective filter coefficients are not changed in Step S11, the end point that have already been set for the respective filter coefficients do not have to be changed. In the case, the CPU 11 keeps retaining the end point. The end point that are newly set correspond to a filter characteristic to which the filter characteristic is instructed to switch in accordance with the user operation.

In Step S4, the values of the envelope signal may not be reset to initial values. If the envelope signal has reached the end point, the end point may be set as initial values (i.e., changing direction is inverted). If the envelope signal has intermediate values in the range of 0 to 1, the envelope signal may maintain the intermediate values.

The CPU 11 then causes the envelope generator 61 to start operation of generating the envelope signal (Step S5).

The envelope generator 61 performs operation of updating the envelop signal. The envelope generator 61 adds the rate value to the envelope signal coef_eg at the point of time, thereby updating the values of the envelope signal (Step S6).

With the updated values of the envelope signal, the filter coefficient calculator 62 calculates and updates the filter coefficients using the above-described equations (1) to (5) (Step S7).

The CPU 11 then determines whether the envelope signal has reached the end point (Step S8).

When determining that the envelope signal has not reached the end point (Step S8: No), the CPU 11 moves to Step S12 to be described later.

In Step S8, when determining that the envelope signal has reached the end point (Step S8: Yes), the CPU 11 moves to next Step S9.

The CPU 11 causes the envelope generator 61 to stop operation of generating the envelope signal (Step S9).

The CPU 11 determines whether to retain the filter coefficients at the point of time (Step S10).

Whether or not to retain the filter coefficients is set in accordance with the user operation. For example, the filter coefficients are retained on the basis of the number of times that the envelope signal reaches the end point or on the basis of characteristics of the musical sound data and changes thereof. As a specific example of the latter case, in modulating the musical sound data, filter setting is adjusted such that the peak of the frequency of the filter for wah-wah effects is consistent with the modulated keys. As another example, when musical sound data is in quadruple time, the first beat is set to have a peak different from peaks of the other beats so as to get the rhythm.

When determining that the filter coefficients are not retained (Step S10: No), the CPU 11 moves to Step S12 to be described later.

In Step S10, when determining that the filter coefficients are retained (Step S10: Yes), the CPU 11 switches the switches 82, 83 of the filter coefficient calculator 62 to the coefficient retaining mode, thereby retaining the filter coefficients at the point of time, and sets the retained filter coefficients as the end point (Step S11).

The CPU 11 determines whether to end the filter coefficient calculation process (Step S12). When determining that the process is not ended (Step S12: No), the CPU 11 moves to the above-described Step S1.

When determining that the filter coefficient calculation process is ended in accordance with the user operation or the like (Step S12: Yes), the CPU 11 ends the filter coefficient calculation process.

Next, a specific example of the above-described filter coefficient calculation process is described.

In the example, filter coefficients for the wah-wah effect are allocated when the envelope signal is in the range of 0 to 1.

Figure 7A:
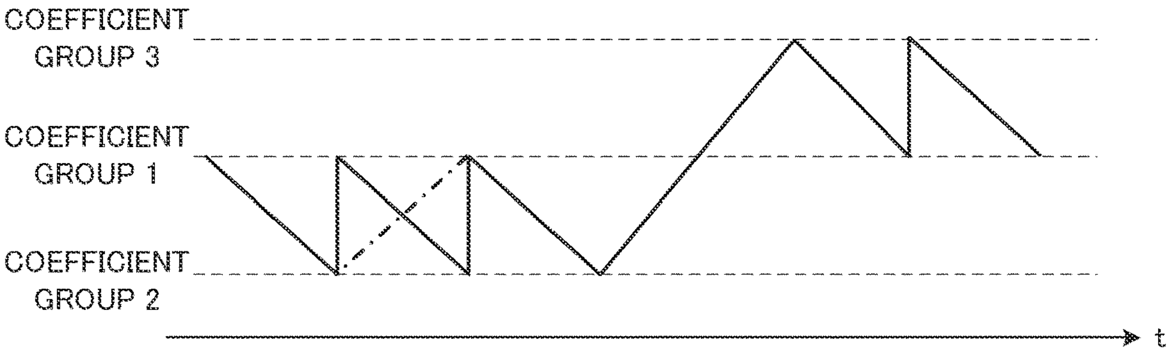
FIG. 7A is a figure to explain transition of filter coefficients in the embodiment.
Figure 7B:
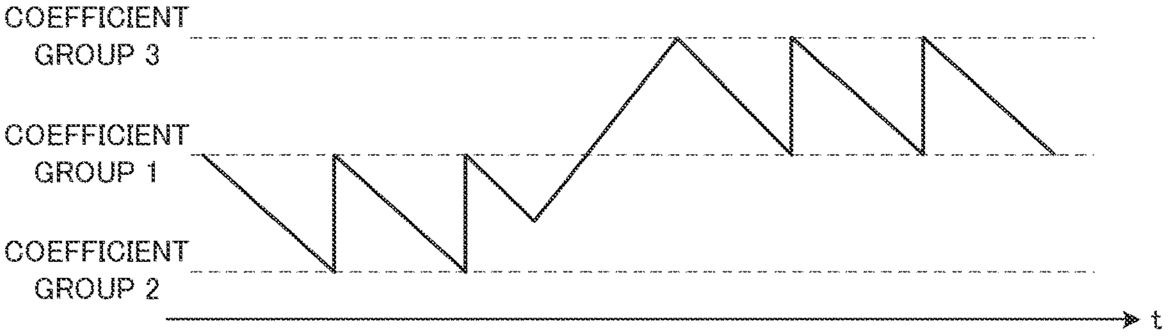
FIG. 7B is a figure to explain transition of filter coefficients in the embodiment.
Figure 8:
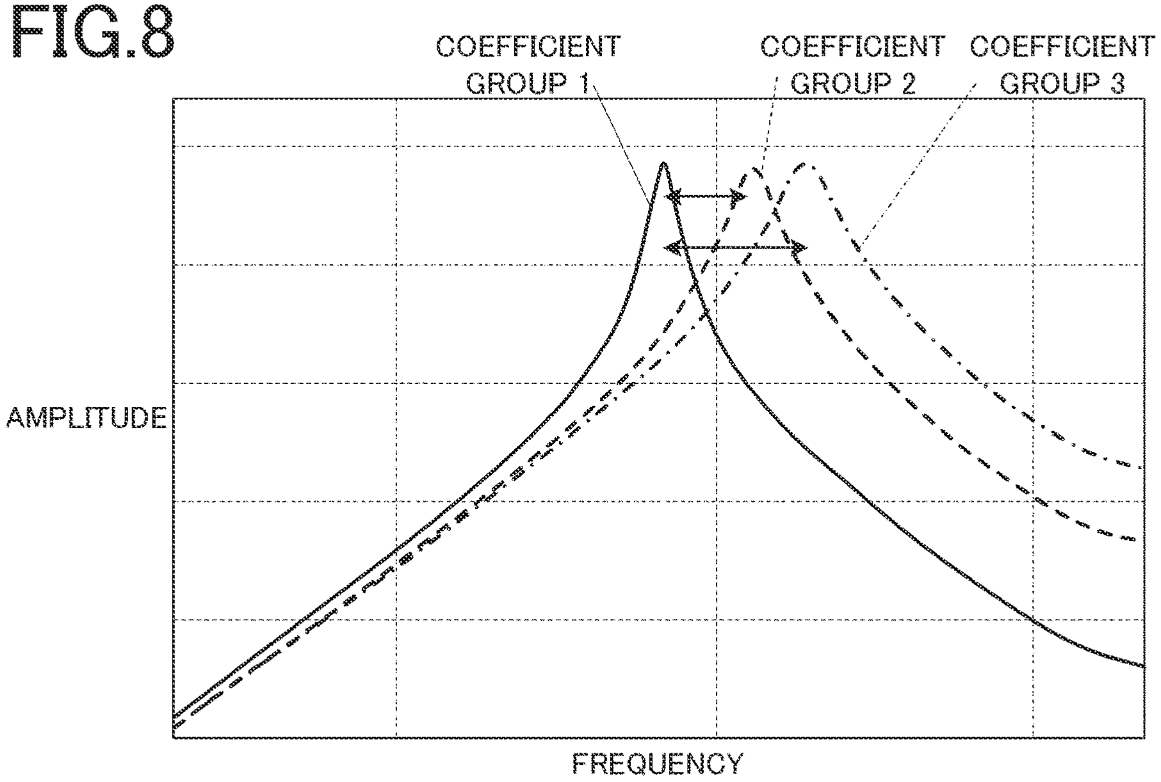
FIG. 8 is a graph showing an example of filter characteristics of wah-wah effects in the embodiment.

FIG. 7A and FIG. 7B are figures to explain transition of the filter coefficients. FIG. 8 is a graph showing the filter characteristic example of the wah-wah effect.

Firstly, the operation when the envelope signal reaches the end point and the filter coefficients are switched is described.

When the user operates the operation receiver 22 or the pedal 23 to which the wah-wah effect is allocated while playing with the keyboard 21, the filter coefficient calculation process is executed, and operation of generating the envelope signals is started (Step S1: No, S3: Yes, S4, S5).

Along with the change of the envelope signal, the filter coefficients are successively updated (Step S6, S7, S8: No, S12: No, S1: Yes, S2: No, S6, S7). The envelope signal finally reaches the end point and stops being generated, and the values of the envelope signal are cleared (Step S8: Yes, S9).

Herein, assume that the filter characteristic is set so as to be switched according to the number of times of operations on a modulation wheel of the operation receiver to which the wah-wah effect is allocated. More specifically, assume that there is issued a command that the filter characteristic is switched to a filter characteristic different from the filter characteristics corresponding to the coefficient group 1 for the start point and the coefficient group 2 for the end point when the number of times of operations reaches a predetermined number. In the case, the filter coefficients are not retained until the number of times that the envelope signal reaches the end point (the number corresponds to the number of times of operations) is equal to a predetermined number (Step S10: No, S12: No), and updates of the filter coefficients are repeated.

Accordingly, as shown in FIG. 7A and FIG. 8, the filter coefficients move between the coefficient group 1 and the coefficient group 2 so as to gradually change from the coefficient group 1 for the start point toward the coefficient group 2 for the end point. The filter characteristics also change between the filter characteristic corresponding to the coefficient group 1 and the filter characteristic corresponding to the coefficient group 2.

Herein, when the envelope signal reaches the end point, the values of the envelope signal may not be cleared but the direction of change may be inverted (see alternate long and short dash line in FIG. 7A). Accordingly, the start point and the end point may switch between the coefficient group 1 and the coefficient group 2.

When the number of times that the envelope signal reaches the end point becomes equal to a predetermined number, the filter coefficients of the coefficient group 2 at the point of time are retained, and the filter coefficients of the coefficient group 2 are set as the start point (Step S10: Yes, S11).

The end point of the filter coefficients is then set to a coefficient group 3 that corresponds to the filter characteristic to which the characteristic is instructed to switch. The coefficient group 3 is different from any of the coefficient group 1, the coefficient group 2, and coefficient groups in transition from the coefficient group 1 to the coefficient group 2. Then the envelope signal starts being generated (Step S12: No, S1: No, S3: Yes, S4, S5). Accordingly, the filter coefficients are successively updated toward the coefficient group 3 along with the change of the envelope signal.

Thus, the start point of the filter coefficients are changed from the coefficient group 1 to the coefficient group 2, and the end point of the filter coefficients is changed from the coefficient group 2 to the coefficient group 3. The filter coefficients are then changed from the filter coefficient group 2 to the filter coefficient group 3. The filter characteristics also change between the filter characteristic corresponding to the coefficient group 2 and the filter characteristic corresponding to the coefficient group 3.

Accordingly, the filter coefficients for the wah-wah effect can be successively switched. This enables updates of the filter characteristics while keeping sounds being output.

Next, the operation when the filter characteristics are switched in accordance with the compulsory reach command of the envelope signal is described.

Similar to the above-described example, when the filter coefficient calculation process is executed in accordance with the user operation, the filter coefficients gradually change from the coefficient group 1 for the start point to the coefficient group 2 for the end point.

When, for example, the user operates a switch of the operation receiver 22 that has the function of switching the filter characteristics, the compulsory reach command of the envelope signal is input in accordance with the user operation (Step S1: Yes, S2: Yes). The filter coefficients at the point of time are retained, and the retained filter coefficients are set as the start point (Step S9, S10: Yes, S11).

The end point of the filter coefficients is set to a coefficient group 3 that corresponds to the filter characteristic to which the characteristic is instructed to switch, and operation of generating the envelope signal is started (Step S12: No, S1: No, S3: Yes, S4, S5). Accordingly, as with the above-described example, the filter coefficients are successively updated toward the coefficient group 3 according to the change of the envelope signal.

Thus, as shown in FIG. 7B, during transition from the coefficient group 1 to the coefficient group 2, the start point of the filter coefficients are set to intermediate values between the coefficient group 1 and the coefficient group 2. The filter coefficients then change toward the coefficient group 3 that is different from the coefficient groups 1, 2.

The filter characteristic may therefore be switched to another characteristic even while the filter characteristic is in the process of change.

As described above, according to the embodiment, when there is a command to switch the filter characteristic to the other filter characteristic that is different from filter characteristics corresponding to the coefficient groups 1, 2 while or after the filter coefficients are changed from the coefficient group 1 to the coefficient group 2, the filter coefficients at the time of the instruction are set as a coefficient group corresponding to the start point. Further, the coefficient group 3 corresponding to the other filter characteristic is set as the end point.

Thus, while the filter characteristic is being changed from the filter characteristic corresponding to the coefficient group 1 to the filter characteristic corresponding to the coefficient group 2, the filter characteristic can be switched to the coefficient group 3 that is different from the coefficient groups 1, 2.

This enables effective switching of the filter characteristics as compared with the known art where the filter characteristic is switched only between two filter characteristics.

Further, according to this embodiment, when there is a command to change the filter coefficients, the filter coefficients at the time of the instruction are retained. Accordingly, the filter coefficients can be changed to other filter coefficients even while the filter coefficients are in transition. This enables more flexible filtering operation than the known art.

Further, switching of the filter coefficients does not need a crossfading mechanism or a delay memory.

Further, according to this embodiment, the filter coefficients to be changed from the coefficient group 2 to the coefficient group 3 are set on the basis of one envelope signal for performing interpolation processing for respective filter coefficients. This prevents mistiming in transition of the filter coefficients, unlike the case where an envelope signal is set to each of the filter coefficients.

Although the embodiment of the present invention has been described, the present invention is not limited to the embodiment but may be variously modified without departing from the scope of the invention.

For example, in the above embodiment, the state of the filter coefficient calculator 62 changes between the coefficient updating mode and the coefficient retaining mode in accordance with the envelope signal and the user operation (compulsory reach command). The trigger for switching the modes may be, however, only either the envelope signal or the user operation.

Further, although the CPU 11 is the main control unit in the above embodiment, this is not the limitation. For example, the processor of the effect imparter 40 may perform at least part of control.

Further, according to the above embodiment, the present invention is applied to an electronic musical instrument provided with the keyboard. The electronic musical instruments to which the present invention is applicable are, however, not specifically limited.

Further, application of the present invention is not limited to electronic musical instruments. The sound effect imparting device according to the present invention is effectively applicable to an effector of a filtering system, for example.

Although one or more embodiments of the present invention have been described, the scope of the present invention is not limited to the above-described embodiment but includes the scope of claims and the scope of their equivalents.

INDUSTRIAL APPLICABILITY

As described above, the filter effect imparting device, the electronic musical instrument, and the control method for the electronic musical instrument according to the present invention can effectively switch filter characteristics.

REFERENCE SIGNS LIST

1 Electronic musical instrument
11 CPU
30 Sound generator
40 Effect imparter

60 Signal processor
61 Envelope generator
62 Filter coefficient calculator
63 Filtering performer
80 Arithmetic block
81 Coefficient table
82 Switch
83 Switch
87 Register
88 Register
89 Register
coef_eg envelope signal

The invention claimed is:

1. A filter effect imparting device comprising:
a characteristic c-variable filter that has a variable filter characteristic corresponding to a coefficient group composed of a plurality of filter coefficients; and
a control circuit that changes the coefficient group from a first coefficient group that is set as a start point to a second coefficient group that is set as an end point,
wherein the control circuit retains the coefficient group during the change and, in newly setting a third coefficient group as the end point, the control circuit sets the retained coefficient group as the start point,
wherein in accordance with an envelope signal that specifies a ratio indicating a closeness of a new coefficient group to be generated to a coefficient group set as the start point and to a coefficient group set as the end point, the control circuit performs interpolation processing between the coefficient group set as the start point and the coefficient group set as the end point to generate the new coefficient group such that the ratio indicated by the envelope signal is satisfied.

2. The filter effect imparting device according to claim 1, wherein in response to being instructed to change the filter characteristic of the characteristic-variable filter from a first filter characteristic to a second filter characteristic, the control circuit
sets a coefficient group that corresponds to the first filter characteristic as the start point,
sets a coefficient group that corresponds to the second filter characteristic as the end point, and then
changes the filter coefficient group from the first coefficient group to the second coefficient group,
wherein in response to being instructed to change the filter characteristic of the character-variable filter to a third filter characteristic that is different from the first filter characteristic and the second filter characteristic during the change or after the change, the control circuit
sets the coefficient group that is retained at a time of being instructed to change the filter characteristic of the character-variable filter to the third filter characteristic as the start point and
sets the third coefficient group that corresponds to the third filter characteristic as the end point.

3. The filter effect imparting device according to claim 2, wherein in response to being instructed to change the filter characteristic to the third filter characteristic during the change of the filter characteristic from the first filter characteristic to the second filter characteristic, the control circuit
stops a process of changing the filter characteristic from the first filter characteristic to the second filter characteristic,
sets the coefficient group that is retained at the time of being instructed to change the filter characteristic to the third filter characteristic as the start point,
sets the third coefficient group corresponding to the third filter characteristic as the end point, and
starts a process of changing the filter characteristic to the third filter characteristic from a filter characteristic that corresponds to the coefficient group retained at the time of being instructed to change the filter characteristic to the third filter characteristic.

4. The filter effect imparting device according to claim 1, wherein the control circuit includes:
an envelope generator that generates the envelope signal, the envelope signal being a time-variable envelope signal;
a filter coefficient calculator that calculates a new coefficient group based on a coefficient group set as the start point, a coefficient group set as the end point, and the envelope signal generated by the envelope generator; and
a filtering performer that performs filtering on musical sound data, based on a filter characteristic that corresponds to the coefficient group calculated by the filter coefficient calculator.

5. The filter effect imparting device according to claim 4, wherein the envelope generator generates the envelope signal that indicates a point between the start point and the end point by the ratio,
wherein in accordance with the ratio indicated by the envelope signal, the filter coefficient calculator calculates a coefficient group that is composed of intermediate values between a coefficient group set as the start point and a coefficient group set as the end point.

6. The filter effect imparting device according to claim 4, wherein the filter coefficient calculator includes:
a first memory that stores a coefficient group corresponding to the start point;
a second memory that stores a coefficient group corresponding to the end point; and
a third memory that stores a coefficient group corresponding to the coefficient group during the change,
wherein in response to being instructed to change the filter characteristic to the third filter characteristic during the change, the filter coefficient calculator loads the coefficient group stored in the third memory into the first memory.

7. The filter effect imparting device according to claim 6, further comprising a fourth memory that stores beforehand coefficient groups corresponding respectively to multiple filter characteristics, wherein
the filter coefficient calculator retrieves a coefficient group corresponding to a designated filter characteristic from the fourth memory and loads the retrieved coefficient group into the first memory and the second memory.

8. The filter effect imparting device according to claim 7, wherein
the control circuit retrieves, from the fourth memory, a coefficient group corresponding to the filter characteristic designated by a user operation and loads the retrieved coefficient group into the first memory and the second memory.

9. The filter effect imparting device according to claim 1, wherein
the third coefficient group is different from any of the first coefficient group, the second coefficient group, and the coefficient group during the change from the first coefficient group to the second coefficient group.

10. The filter effect imparting device according to claim 1, wherein while successively changing a new coefficient group to be generated from a coefficient group set as the start point to a coefficient group set as the end point, the control circuit successively updates, with the newly coefficient group, a coefficient group that is set to the characteristic-variable filter, and when the successively-updated coefficient group reaches the coefficient group set as the end point, the control circuit stops generating the new coefficient group and updating the coefficient group that is set to the characteristic-variable filter.

11. The filter effect imparting device according to claim 1, wherein the control circuit changes the filter characteristic of the characteristic-variable filter in accordance with a user performance operation.

12. An electronic musical instrument comprising:

a performance operation receiver with which a user performs a performance operation;

a musical sound generator that generates a musical sound corresponding to the performance operation on the performance operation receiver;

a characteristic-variable filter that has a variable filter characteristic corresponding to a coefficient group composed of a plurality of filter coefficients;

a control circuit that changes the coefficient group from a first coefficient group that is set as a start point to a second coefficient group that is set as an end point; and an effect imparter that performs, using the characteristic-variable filter, filtering on the musical sound generated by the musical sound generator, wherein the control circuit retains the coefficient group during the change and, in newly setting a third coefficient group as the end point, the control circuit sets the retained coefficient group as the start point, and wherein in accordance with an envelope signal that specifies a ratio indicating a closeness of a new coefficient group to be generated to a coefficient group set as the start point and to a coefficient group set as the end point, the control circuit performs interpolation processing between the coefficient group set as the start point and the coefficient group set as the end point to generate the new coefficient group such that the ratio indicated by the envelope signal is satisfied.

13. A control method for an electric musical instrument that includes: a performance operation receiver with which a user performs a performance operation; a musical sound generator that generates a musical sound corresponding to the performance operation on the performance operation receiver; and a characteristic-variable filter that has a variable filter characteristic corresponding to a coefficient group composed of a plurality of filter coefficients, the method comprising causing the electronic musical instrument to perform:

controlling comprising changing the coefficient group from a first coefficient group that is set as a start point to a second coefficient group that is set as an end point; and effect imparting comprising performing, using the characteristic-variable filter, filtering on the musical sound generated by the musical sound generator, wherein the controlling comprises retaining the coefficient group during the change and, in newly setting a third coefficient group as the end point, sets setting the retained coefficient group as the start point, and wherein the controlling comprises, in accordance with an envelope signal that specifies a ratio indicating a closeness of a new coefficient group to be generated to a coefficient group set as the start point and to a coefficient group set as the end point, performing interpolation processing between the coefficient group set as the start point and the coefficient group set as the end point to generate the new coefficient group such that the ratio indicated by the envelope signal is satisfied.

* * * * *